Oct. 22, 1968 C. K. BAREFOOT 3,407,106
APPARATUS FOR RETREADING TIRES
Filed Aug. 24, 1964 7 Sheets-Sheet 1

INVENTOR:
CARLTON KEITH BAREFOOT.
BY Owen & Owen
ATT'YS.

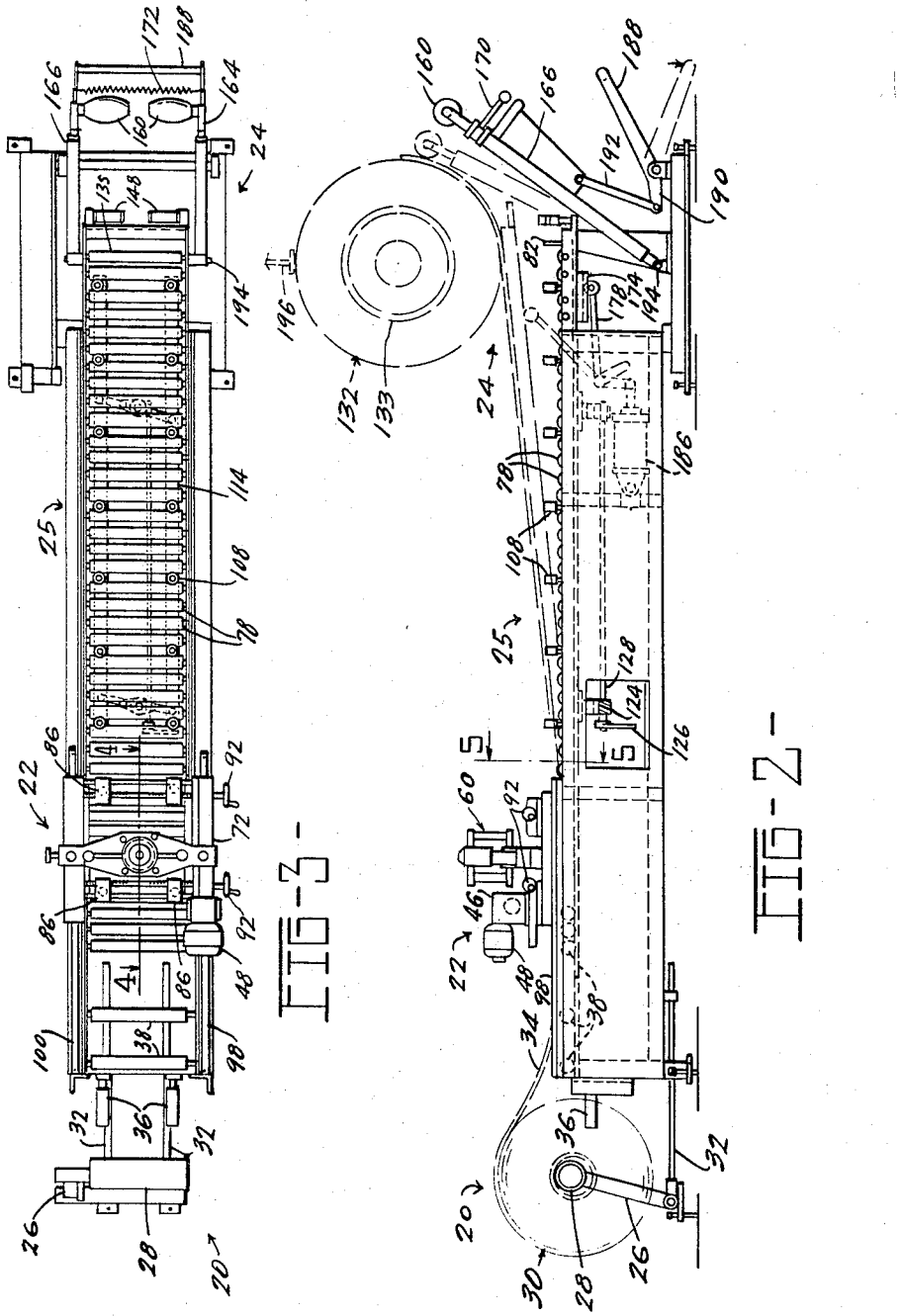

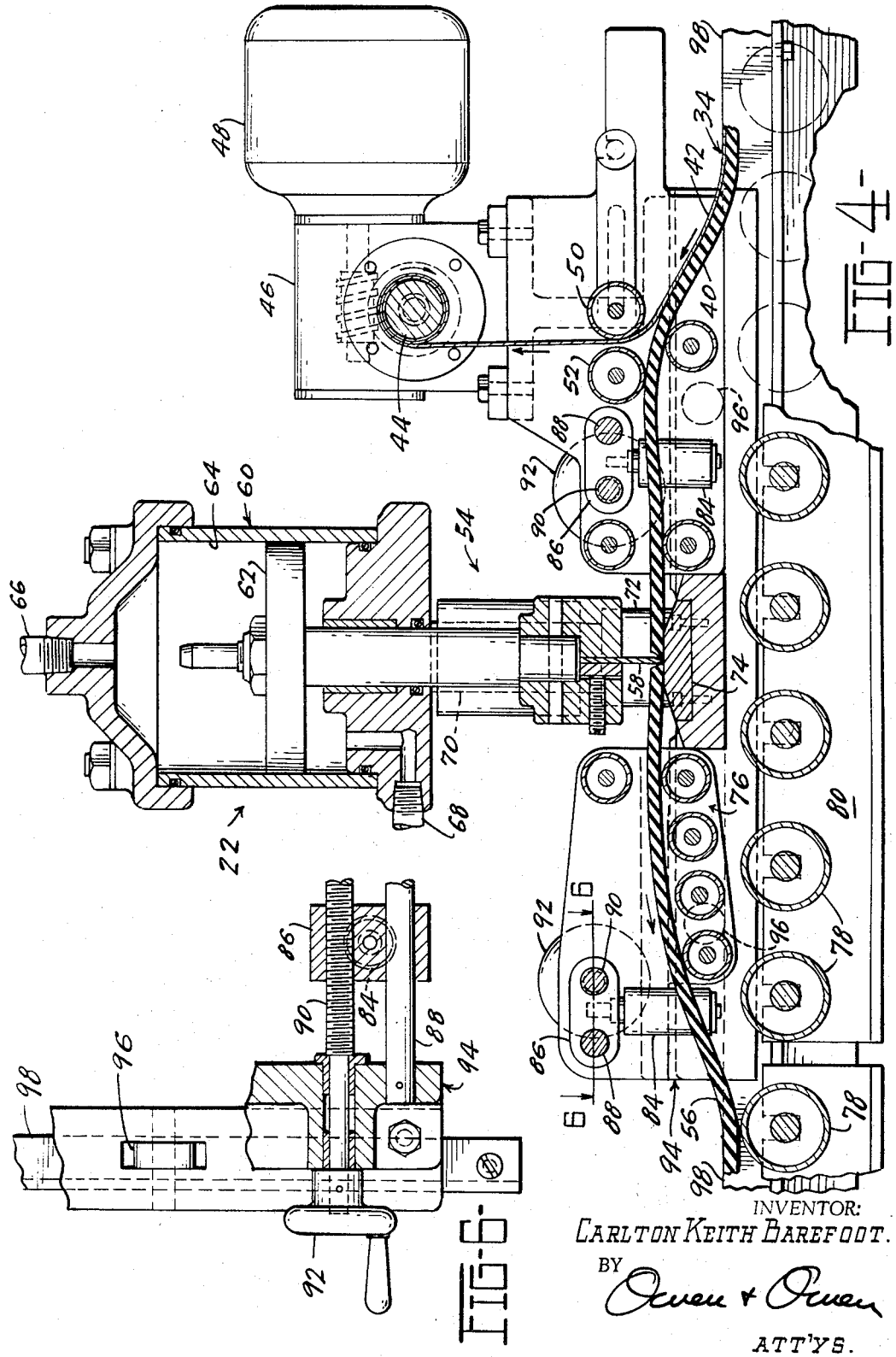

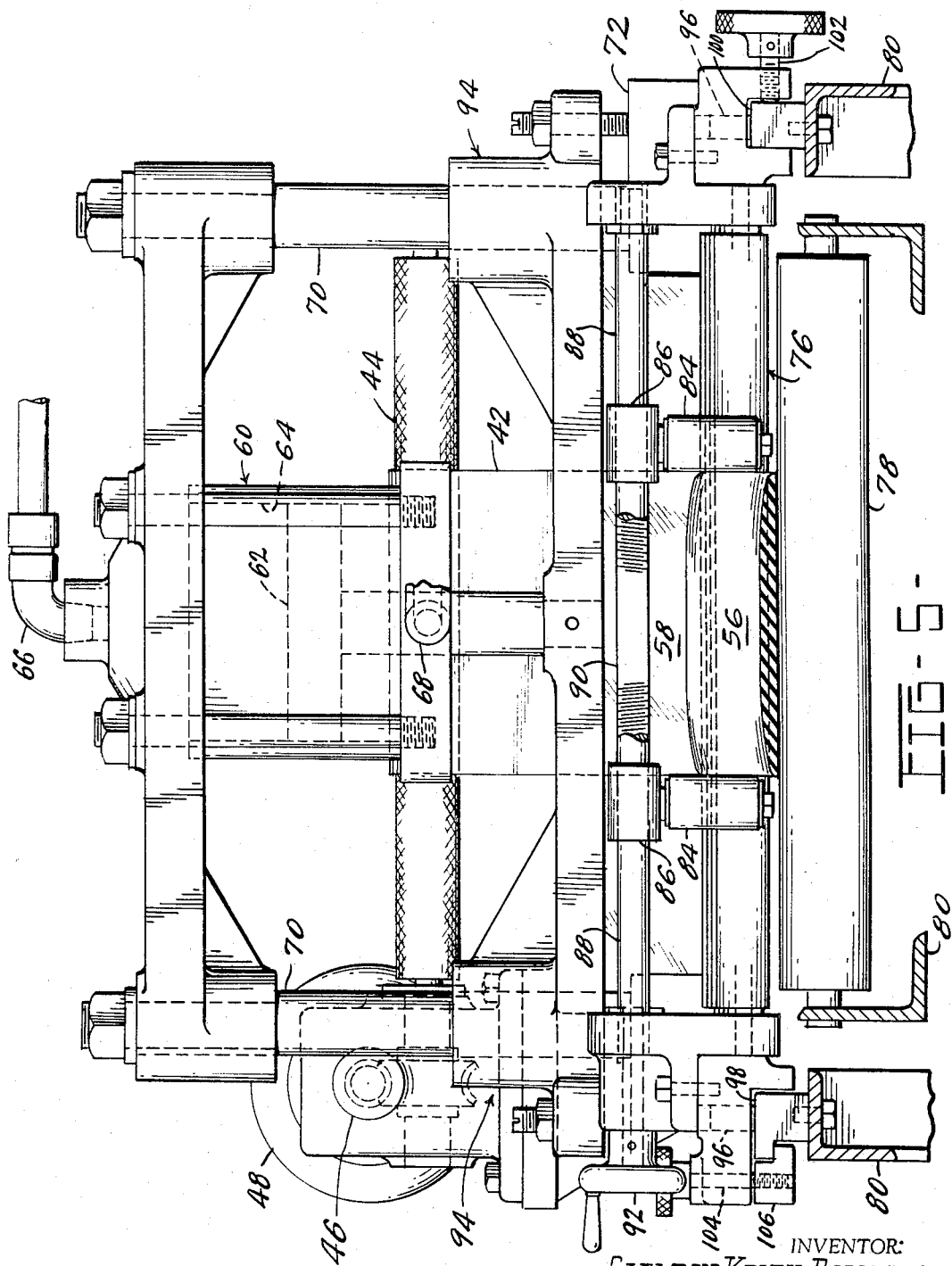

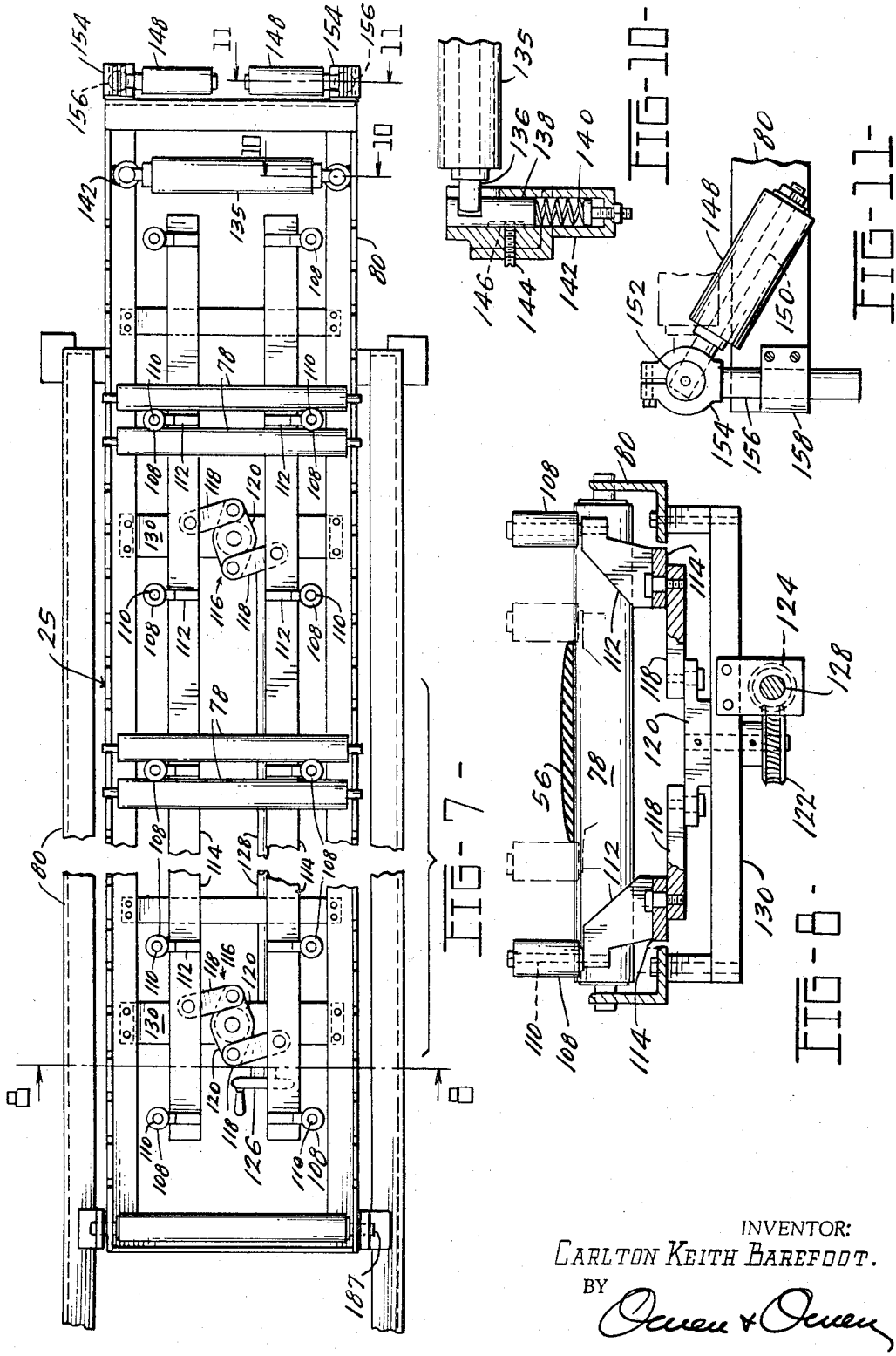

Oct. 22, 1968     C. K. BAREFOOT     3,407,106
APPARATUS FOR RETREADING TIRES
Filed Aug. 24, 1964     7 Sheets-Sheet 6
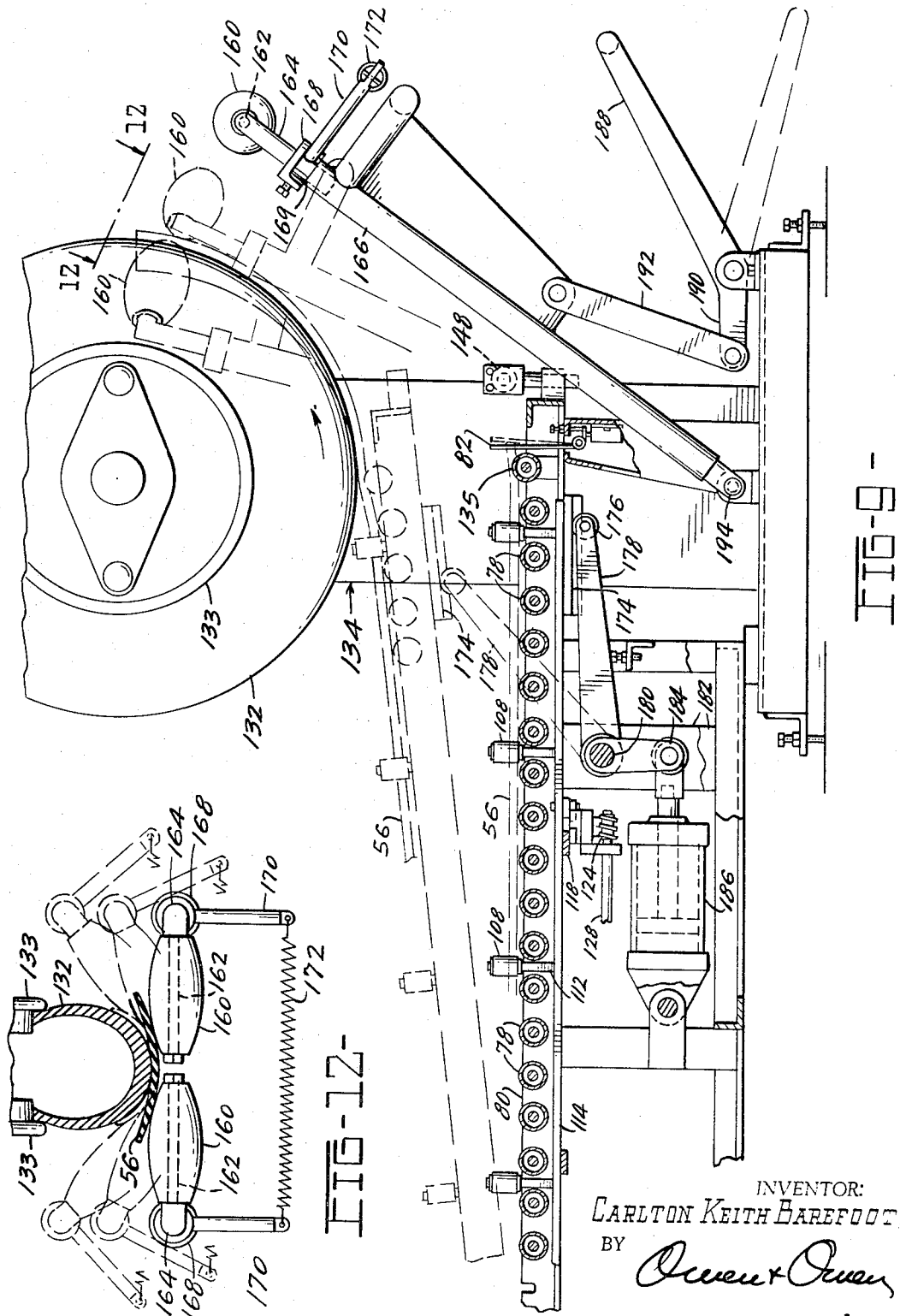
INVENTOR:
CARLTON KEITH BAREFOOT,
BY
ATT'YS.

Oct. 22, 1968     C. K. BAREFOOT     3,407,106

APPARATUS FOR RETREADING TIRES

Filed Aug. 24, 1964     7 Sheets-Sheet 7

INVENTOR:
CARLTON KEITH BAREFOOT.
BY Owen + Owen
ATT'YS.

United States Patent Office 3,407,106
Patented Oct. 22, 1968

3,407,106
APPARATUS FOR RETREADING TIRES
Carlton Keith Barefoot, Muncie, Ind., assignor to Bacon American Corporation, Muncie, Ind., a corporation of Indiana
Filed Aug. 24, 1964, Ser. No. 391,450
8 Claims. (Cl. 156—405)

ABSTRACT OF THE DISCLOSURE

Tires are retreaded by a method and apparatus which adjusts the circumference of the tire to equal the length of tread stock which is automatically cut to a predetermined length. The apparatus includes a unique arrangement for moving the tread stock from a supply roll to the tire carcass with the cover of the tread stock being pulled to avoid stresses on and deformation of the rubber strip. The apparatus also includes an arrangement for first applying the tread stock to the tire carcass under light pressure, subsequently under higher pressure, and finally by means of stitching rolls, to provide a three-step applying process. The apparatus for severing the tread stock also is unique in including a severing knife which moves along with the tread stock to sever the stock without stopping its movement toward the tire carcass.

---

This invention relates to a method and apparatus for handling rubber stock and specifically for applying retreading stock to a tire body or casing which forms the basic structure for a retreaded tire.

In the process of retreading a tire, the peripheral surface of a used tire casing is buffed or ground away to produce a roughened surface having a predetermined cross section to receive the tread stock. This operation also cleans the surface and roughens it to help obtain good adhesion between the casing and the tread stock. A layer of adhesive, such as rubber cement, is then applied to the casing, preferably by spraying. The tread stock with a properly prepared surface is then applied to the peripheral surface of the casing. The combination is placed in a mold or matrix and subsequently vulcanized to complete the retreaded tire.

The tread stock used in the retreading process is supplied in long lengths, usually on rolls, with a suitable covering strip on the tacky or adhesive surface of the stock which is to be adhered to the tire casing. This surface usually has a coating of adhesive such as cushion gum, although in some instances the unvulcanized rubber may provide sufficient adhesion without a coating. The cover prevents the layers of stock from sticking together and keeps the surface clean and fresh to provide more effective adhesion between the tire casing and the tread stock. The protective cover is pulled off the stock shortly before it is applied to the casing, to minimize contamination.

The present invention is concerned with that portion of the retreading process in which the tread stock is handled and applied to the periphery of the prepared tire casing. Previously, this operation has been effected by hand with the tire casing rotatably held on a suitable support and rotated by hand as the tread stock was applied thereto. An end of the tread stock was pressed onto the tire casing with the tire then rotated and the stock unrolled from a supply by the operator. Between the supply and the casing, the operator would strip a protective cover from the surface of the stock to be adhered to the casing and then press the exposed surface onto the casing.

It is important, of course, to apply the stock symmetrically with respect to the casing. An attempt to accomplish this previously has been made by applying a colored central stripe on the tire stock and by using a pointer associated with the tire casing support, with the center line and pointer being aligned as a stock is applied to the casing. With even the most experienced tire builder, however, a certain amount of waver of the stock relative to the tire casing still resulted.

With the tread stock applied completely around the periphery of the tire, the stock previously was cut and the cut end placed in abutting relationship with the end first applied to completely cover the periphery. The stock was then fully adhered to the tire casing with stitching rollers which were brought into contact with the central portion of the stock and then pushed toward the sides to completely wrap the stock on the tread portion and shoulder portions of the casing.

The overall hand method of applying the tread stock was extremely slow and time consuming, with the operator being capable of building only a few casings per hour. Secondly, as pointed out above, the tread stock was not always applied straight and symmetrically around the entire periphery of the casing, thereby forming a non-uniform wall thickness. The hand method of applying the stock also resulted in another serious defect. The unvulcanized rubber of the tread stock is easily deformable and can be easily stretched. Consequently, when the operator stripped the cover from the adhesive surface and also when he applied pressure to the stock to adhere it to the tire casing, the stock was somewhat extruded or stretched. Unfortunately, the degree of extrusion or stretch was not uniform, the result being that the thickness of the stock around the periphery of the casing varied because of the non-uniform stretching. Because of the resulting non-uniform thickness, it often has been necessary heretofore to employ thicker tread stock than would otherwise be required. For example, on a 7.50 x 14 tire, tread stock 12/32 inch has been used whereas tread stock of only 10/32 inch thickness otherwise would be required, in many instances, if the stock were applied uniformly and not stretched.

As evident from the above described method, the length of the tread stock used on a particular tire was determined by the actual circumference of the tire casing. The circumference of tires will vary even though they may all be of a given nominal size, as discussed in my co-pending application Ser. No. 313,806 entitled "Method and Apparatus for Rebuilding Tires," now abandoned, and in my continuing application, Ser. No. 393,001, filed on or about Aug. 24, 1964 and carrying the same title. For example, the circumference of a 7.50 x 14 tire has been found to vary between approximately 79 inches and 85 inches. With the method heretofore used, the tread stock applied to the 79-inch tire will be 79 inches long while that applied to the 85-inch tire will be 85 inches long. The built-up tires will all be vulcanized in a matrix of a given diameter. Consequently, while the final vulcanized tires will have the same diameter and periphery, one will actually contain substantially more rubber, up to an equivalency of approximately a 6 inch length of tread stock. While it might be thought initially that the extra rubber on the tire that originally had an 85-inch periphery would be beneficial, actually the opposite may be true. The tire with the extra tread stock builds up substantially more heat when running on a vehicle because rubber exhibits a hysteresis effect, with cyclic energy retained internally therein as the tire rotates and flexes. The extra rubber accentuates this heat buildup and has a greater tendency to cause failure at the inner face of the tire where the vulcanized rubber stock tends to become gummy and thereby separate from the casing. The excess heat apparently is also caused at least in part by the fact that during rotation of a tire, a tread wave builds up in the tire in front of the point where it contacts the ground. This wave is dependent in part upon the mass of the rubber and the wave is larger as the mass of the rubber increases, thereby causing greater flexing and heat buildup.

The present invention is directed to a method and apparatus for rebuilding tires without the deficiencies and disadvantages outlined above and as discussed in my aforesaid patent applications. In accordance with the invention, the tread stock is removed from the source of supply and laid out generally horizontally, after which a strip of the tread stock of predetermined length is cut from the unrolled piece. A forward end of the stock is placed in contact with the tire casing, with the adhesive surface of the stock contacting the casing. The casing is then rotated in a direction such that the tread stock is wound thereon while being guided and directed accurately so as to assure that the stock will be applied in a straight line without waver. The tread stock also is preferably fully supported up to the point at which it contacts and is applied to the tire casing, to prevent the possibility of stretching or attenuation of the stock between the tire and the last point at which it is supported. The stock also is applied under uniform pressure and is moved with a uniform force, particularly as the cover is stripped therefrom, to assure that any small attenuation of the strip will be uniform.

The practice according to the invention also minimizes handling of the tread stock by the operator, which minimizes the possibility of contamination of the surfaces of the stock prior to vulcanization, and subsequent delamination of the stock. Moisture and even dirt or oil from the operator's hands, for example, can prevent a proper bond from being obtained between the tire casing and the stock during vulcanization. The invention also enables a tire to be built in a fraction of the time formerly required, with the output achievable by the new method and apparatus being several times those previously achieved.

In accordance with the method and apparatus of the invention, the tire casings also are manipulated to establish uniform diameters and circumferences thereof prior to the application of the tread stock. In the preferred form, this is accomplished by placing the tire under an internal air pressure and moving the tire beads toward and away from one another to change the diameter and circumference. The diameter and circumference of the tire thereby are regulated to accept a predetermined length of the tread stock rather than cutting the stock to fit the tire, as has heretofore been the case. This procedure has one advantage that all tire casings of a given nominal size or at least to be vulcanized in a particular matrix, will have the same amount of tread stock applied thereto, regardless of their initial actual diametrical and circumferential dimensions. This assures that each tire, after vulcanization, will have the same amount of rubber applied thereto and not an amount proportional to the original, relaxed diameter and circumference. By way of example, as previously mentioned, a 7.50 x 14 tire might have a circumference ranging from 79 to 85 inches. In such an instance, the tread stock might be precut to a length of 80 inches with the circumferences of the casings then decreased or increased to 80 inches from their original dimensions. A 79-inch tire, for example, would have the beads pressed together slightly to increase the circumference to 80 inches, while an 85 inch tire would have the beads spread to decrease the circumference to 80 inches. Thus, 80 inches of tread stock would be applied to every 7.50 x 14 tire regardless of its original diameter. Actually, the diameter to be used will be sufficiently toward the lower end of the range that only a fraction of one percent of the tires will be increased in diameter to increase their circumference sufficiently to equal the length of the precut tread stock. In some instances, tires with circumferences below the predetermined one will be processed and treated as a smaller nominal tire size, so that a 7.50 x 14 tire with a 79 inch circumference might be treated and vulcanized in a 7.00 x 14 matrix. Consequently, the diameters of the vast majority, if not all of the tires, will be reduced rather than increased.

Besides making the end product more uniform, a saving in rubber has been found to be possible, averaging one-and-one-half pounds of rubber per tire. This constitutes a substantial savings at today's rate of approximately 30 cents per pound, resulting in an average savings of 45 cents per tire. Although the tire casings will have some tendency to return to their original dimensions after the tread stock has been applied and after the tire beads have been released, nevertheless the dimensional range of any given nominal size tire will be substantially narrowed and may move toward the lower end of the previous range. This enables a smaller matrix to be employed than otherwise, if desired. The smaller diameter also enables the actual radius of the tire to be closer to the rolling radius, and, hence, less flexing of the tire during operation should result.

It is, therefore, a principal object of the invention to provide a method and apparatus for measuring, cutting, and applying tread stock to a tire body, which method and apparatus have the advantages outlined above.

Other objects and advantages of the invention will be apparent from the following detailed description of a preferred embodiment thereof, reference being made to the accompanying drawing, in which:

FIG. 2 is a side view in elevation of the apparatus shown in FIG. 1;

FIG. 3 is a plan view of the apparatus shown in FIGS. 1 and 2;

FIG. 4 is a greatly enlarged view in vertical cross section taken along the line 4—4 of FIG. 3;

FIG. 5 is a view in transverse, vertical cross section taken along the line 5—5 of FIG. 2;

FIG. 6 is an enlarged, fragmentary view in cross section taken along the line 6—6 of FIG. 4;

FIG. 7 is a fragmentary plan view on an enlarged scale similar to FIG. 3, but with most of the upper components of the apparatus removed;

FIG. 8 is an enlarged view in transverse cross section taken along the line 8—8 of FIG. 7;

FIG. 9 is an enlarged, fragmentary view in elevation, with parts removed and with parts in cross section, of the right end of the apparatus shown in FIGS. 1–3;

FIG. 10 is a detailed view in cross section taken along the line 10—10 of FIG. 7;

FIG. 11 is a detailed view in elevation taken along the line 11—11 of FIG. 7;

FIG. 12 is a top view taken generally along the line 12—12 of FIG. 9;

Figure 1:
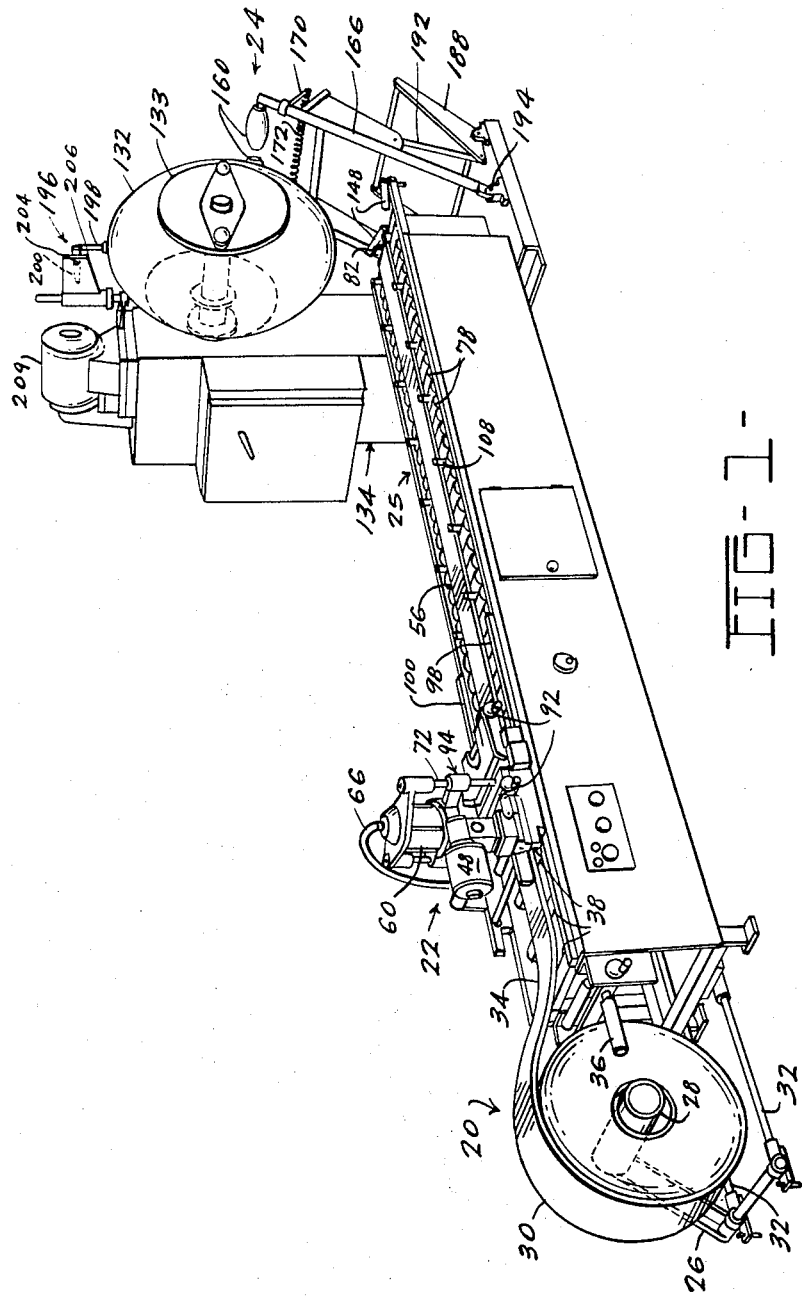
FIG. 1 is an overall view in perspective of apparatus for handling and applying tread stock to a tire casing according to the invention.

Referring particularly to FIGS. 1–3, the basic tread stock handling and applying apparatus includes a supply station indicated at 20, a severing station indicated at 22, and a stock applying station indicated at 24. The stock is moved along a conveyor 25 from the station 20 through the severing station 22 to the applying station 24, then being severed at the station 22. The forward end of the severed strip is then applied to and wound around a tire casing. Subsequently, the casing with the applied tread strip is placed in suitable vulcanizing apparatus to vulcanize the strip to the casing and thereby complete the retreading operation.

Supply station

The supply station 20 includes a supporting arm 26 rotatably carrying a roller 28 for receiving a roll 30 of tread stock. The arm 26 is connected with the severing station 22 by a pair of connecting bars 32. A strip 34 from the tread stock roll 30, which is centered on the roller 28 by centering rollers 36, is carried on supporting rollers 38 to the severing station 22. The supply roll 30 includes a sufficient length of the tread stock strip 34 to retread a number of tire casings with the roll 30 being supplied to the retreader from a tire manufacturer in a ready-to-apply form.

The tread stock strip 34 includes a layer 40 (FIG. 4) of unvulcanized rubber and a cover 42 of any suitable non-adherent material, such as a plastic film. The unvulcanized rubber layer 40 is soft and readily subject to deformation and elongation; hence, it must be handled carefully until wrapped on a tire carcass, stitched down, and placed in the vulcanizing matrix. The upper surface of the layer 40, as seen in FIG. 4, is the surface by which the layer is applied to the tire casing and has a soft and sticky coating which is susceptible to contamination. The cover 42 prevents contamination and also prevents the strip 34 from adhering to itself on the roll 30. It is important that the cover 42 be removed from the layer 40 immediately before it is to be used to minimize the time in which the adhesive surface of the layer 40 is exposed to the atmosphere, and hence subject to contamination and drying or hardening.

Severing station

Means for moving the strip 34 along the conveyor 25 constitutes part of the severing station 22. The moving means includes a knurled power roller 44 (FIGS. 4 and 5) driven through a suitable gear reducer 46 by a motor 48, with the roller 44 being located across the conveyor 25 and the path of travel of the stock strip 34, and spaced thereabove. When the roller 44 is driven in a clockwise direction, as shown in FIG. 4, it pulls the cover 42 from the layer 40 around an idler roller 50. The weight of the rubber layer 40 may be sufficient to separate it from the cover 42 without following the cover, but a blocking roller 52 is located slightly spaced from the idler roller 50 to prevent this from occurring.

The power roller 44 provides the sole means for moving the strip 34 from the roll 30 to the applying station 24. As earlier discussed, the layer 40 is unvulcanized and easily deformable so that the utmost care must be used in moving it. From the point that the strip 34 moves from the roll 30 to the idler roller 50, any tension is applied mainly to the cover 42 and not to the layer 40 so that the pulling force of the roller 44 is applied to the strip of tread stock through the cover 42. As the layer 40 moves beyond the power roller 44 toward the station 24, it is under slight compression from the pushing force of the roller 44 and is not subject to deformation.

As the exposed layer 40 moves beyond the vertical plane of the power roller 44, it moves through a cutter assembly 54 which, when actuated, cuts the layer 40 into a severed strip 56 of predetermined length. The cutter assembly 54 includes a suitable cold cutting blade 58 powered by a fluid-operated ram 60 including a piston 62 and a cylinder 64. Power fluid such as hydraulic oil is supplied and exhausted through two control lines 66 and 68. The ram 60 is held by suitable supporting posts 70 and brackets 72 (FIG. 5). The cutter assembly 54 also includes a back-up support or bar 74 (FIG. 4) which provides a cutting surface to cooperate with the blade 58.

By placing the power roller 44 between the cutter assembly 54 and the supply station 20, the roller 44 always is engaged with the cover 42 and is not separated therefrom when the strip is cut.

Beyond the cutting blade 58, the stock moves over a supporting roller assembly 76 and onto conventional conveyor rollers 78 supported by a suitable frame 80 of the conveyor 25. The layer 40 moves along the rollers 78 until it contacts a limit switch trip lever 82 (FIG. 9) at the end of the conveyor frame 80, which stops the drive motor 48, and hence, the layer 40. At this time, the ram 60 can be operated to cause the blade 58 to descend and cut the layer 40 and thereby form the severed strip 56. The motor 48 remains stopped until the severed strip 56 has been applied to a tire casing.

The layer 40 is maintained centered with respect to the cutter assembly 54 by two pair of centering rollers 84 (FIGS. 4–6) which are suspended from bearing blocks 86 mounted on a supporting bar 88 and a drive screw 90. The screw 90 has symmetrical right and left hand threads to cause the blocks 86 and the rollers 84 to move equal distances toward and away from one another when the screw 90 is turned. The screw 90 is manually rotated from one side of the apparatus by a control handle 92 to adjust the distance between the rollers 84 for the particular tread stock being used. Regardless of the adjustment of the rollers 84, they always remain symmetrically located with respect to the longitudinal axis of the cutter assembly 54 and the conveyor 25.

The apparatus also is provided with a longitudinal adjustment to change the length of the severed strip 56. For this purpose, the entire cutter assembly 54, along with the power roller 44 and its drive means, the roller assembly 76, and the centering rollers 84 and their adjusting means, are mounted on a single frame 94. The frame 94 has rollers 96 which rotatably support the frame on rails 98 and 100 affixed to the conveyor frame 80. The entire cutter frame 94 and its components can be pushed along the conveyor frame 80 to properly position the blade 58 at a predetermined distance from the limit switch trip lever 82 to cut the strip 56 to a predetermined length. When the cutter frame 94 is properly positioned, it is held by a first positioning bolt 102 (FIG. 5) which is turned horizontally into the rail 100 and a second positioning bolt 104 which tightens a clamp 106 against the rail 98.

It is essential that the strip 56 of tread stock be centered precisely when applied to a tire casing. To accomplish this, a plurality of side guide rollers 108 (see particularly FIGS. 7 and 8) are located at suitable distances along the conveyor and are symmetrically spaced from the longitudinal axis thereof. The rollers are adjustably supported to accommodate stock of different widths. The adjustment can be accomplished by any suitable mechanism and the specific means shown are for purposes of illustration and do not, in detail, constitute part of the invention. As shown, the rollers 108 are mounted on bearing rods 110 which are affixed to supporting brackets 112 extending upwardly between the conveying rollers 78, only a few of which are shown in FIG. 7. The brackets 112, in turn, are affixed to bracket bars 114 which are parallel and move equal distances toward and away from the longitudinal axis of the conveyor 25 by linkages 116. The linkages 116 include connecting links 118 which are pivotally connected to the bars 114 and are also pivotally connected to central power links 120. The links 120 are connected to worm wheels 122 engaged by worm gears 124 which are rotated by a handle 126. The worm wheels 122 of all the linkages 116 are rotated together through a drive shaft 128.

The side roller assemblies are mounted on suitable transverse supporting bars 130 which are affixed to the conveyor frame 80.

In operation, when the handle 126 is turned to rotate the drive shaft 128 and the worms 124, the worm wheels 122 are rotated to turn the links 120 and move the links 118 and the bars 114 inwardly and outwardly. Thus, by rotating the handle 126, the side rollers 108 can be moved in and out to accommodate the desired width of the severed strip 56 while assuring that the strip 56 will be centered with respect to the conveyor and a tire casing.

Applying station

With the strip 56 uncovered, cut to proper length, and centered on the conveyor, it is ready to be applied to a tire casing. Toward this purpose, a tire casing 132 is mounted on bead plates 133 with the plates 133 held by a support or stand 134 which rotatably supports the tire casing 132 centrally over the end of the conveyor, above the trip lever 82. After the strip 56 has engaged the lever 82 and has been severed, the end of the conveyor frame 80 is raised to place the adhesive surface of the strip 56 in contact with the outer surface of the casing 132, as shown in dotted lines in FIG. 9. The casing 132 already has been prepared to receive the strip 56, being buffed or ground to produce a surface that follows in cross section a recommended template. The buffing action serves to roughen the rubber to provide good base for cementing the strip 56. The casing is also sprayed with rubber cement as a part of the normal preparation. After the strip 56 is placed in contact with the casing 132, the casing and the bead plates 133 are slowly rotated in a counterclockwise direction, as shown in FIG. 9, with the strip being forced into contact with the casing by means of an end pressure roller 135 (FIGS. 7, 9, and 10). As shown in FIG. 10, each end of the pressure roller 135 has an axle 136 which is rotatably mounted in a cylindrical member 138 urged upwardly by a spring 140 located in a housing 142. The limit of travel of the roller 135 is determined by a set screw 144 extending into a groove 146 in the member 138.

After the strip 56 is placed in contact initially with the casing 132 by the pressure roller 135, it is guided up around the casing by a pair of diagonal guide rollers 148. The rollers 148, shown in FIG. 10, are rotatably mounted on axles 150 which are affixed to pivot members 152 held in clamps 154. The clamps 154 in turn are supported on rods 156 held by brackets 158 affixed to the conveyor frame 80.

The strip 56 is given a final application of force by a pair of generally elliptical stitching rollers 160 (FIGS. 9 and 12). The rollers 160 are rotatably mounted on axles 162 which are affixed to supporting rods 164 rotatably mounted in supporting tubes 166. The tubes 166 have collars 168 with slots 169 through which extend arms 170 attached to the rods 164. A spring 172 is connected between the arms 170 to urge the rollers 160 toward the aligned position of FIG. 12, the rollers being prevented from moving beyond their aligned positions by the ends of the slots 169 cooperating with the arms 170.

The stitching rollers 160 automatically move to the positions shown in dotted lines in FIG. 12 as they are pushed further toward the casing 132. As they so move, they apply pressure smoothly to the sides of the strip 56 and press it around the sides of the casing. The casing 132 is driven through several revolutions as the strip is applied to apply pressure fully to the strip through the roller 135 and the rollers 160, thereby assuring good bonding contact between the strip and the casing.

The conveyor can be raised and the rollers 160 moved toward the casing by any suitable means. As shown in FIG. 9, the conveyor frame 80 has a roller track 174 mounted below the frame with the track 174 engaged by a roller 176 of a lifting crank 178. The crank 178 is mounted on a shaft 180 which is rotatably supported by frame members 182 and driven through a drive link 184. The link 184 is driven by a power ram 186 to move the link 178 in a counterclockwise direction and thereby raise the conveyor frame 80 and the rollers 78. For this purpose, the frame 80 can be provided with pivotal joints 187 (FIG. 7) at positions toward the supply station 20. The pivots preferably are on the casing side of the forwardmost position of the severing station 22.

A foot lever 188 has an extension 190 which moves the stitching rollers 160 through a connecting link 192 to move the tubular support 166 about a pivot 194 and to move the rollers 160 around the tread stock strip 56 on the casing 132.

A tire gauge indicated at 196 includes a feeler 198 which is positioned to contact the periphery of one of the tire casings 132 and a pointer 200 which indicates the diameter of the tire contacted by the feeler 198 on a suitable scale 202. The pointer and the feeler are pivotally mounted by a pivot pin 204 on a bracket 206 which is affixed to the stand 134 at a predetermined distance above the bead plates 133. The entire gauge can be swung back out of the way at all times except when the diameter of the casing is to be sensed.

Figure 14:
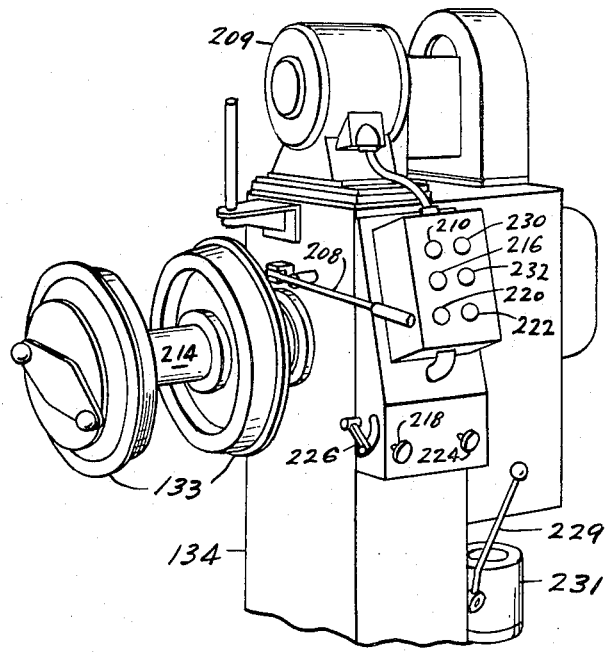
FIG. 14 is a somewhat schematic view in perspective of a tire support and control stand at the right end of the apparatus.
Figure 13:
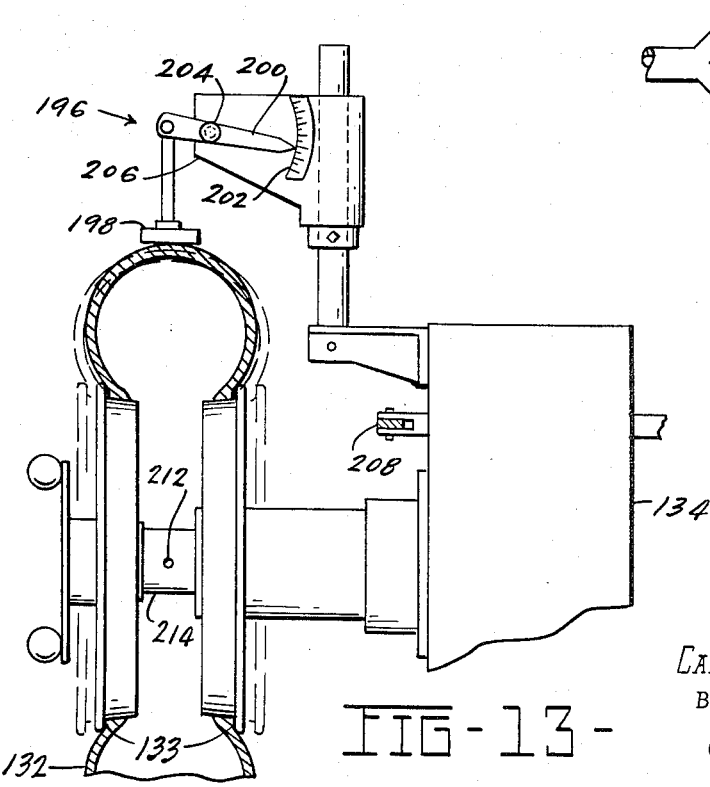
FIG. 13 is a fragmentary view in elevation showing bead plates and a tire gauge at the right end of the apparatus, with a tire casing in section.

The operation of the retreading apparatus will now be discussed in detail, with reference being made to the controls shown in FIG. 14. One of the prepared tire casings is first placed between the bead plates 133 and the bead plates then moved inwardly to aid in seating the beads of the casing on the rims of the bead plates. This is accomplished by manipulating a lever 208 to engage a clutch for a motor 209 and jog the beads inwardly when the motor is started by contacts closed by a button 210. The bead plates 133 can be moved toward and away from one another, and rotated, by the mechanical drives shown in the aforesaid patent application. Once the casing beads are seated on the bead plates 133, air is admitted through openings 212 (FIG. 13) formed in a hollow bead shaft 214, by opening a supply valve when a valve knob 216 (FIG. 14) is pulled out. Air under a pressure of approximately 8–10 p.s.i. is then admitted into the interior of the casing 132, this pressure being sufficient to enable the casing to withstand pressure without undue deformation as the retread stock is applied therearound.

After the air is applied to the casing, the tire gauge 196 is swung into position with the feeler 198 centered on the periphery of the tire. The bead plates 133 are then moved outwardly by driving the motor 209 in the opposite direction through closing contacts of a button 218, or are moved inwardly by pressing the button 210, to adjust the casing diameter to a preselected dimension, as indicated on the scale 202. The casing diameter is decreased by separating the bead plates 133 and can be increased slightly by moving the beads toward one another. Seldom, however, will a casing be so small that the diameter must be increased to meet the preselected figure. Even then, the extent of the increase in diameter will be small.

It may be noted that air preferably is admitted directly into the interior of the casing so that the air pressure is exerted directly on the interior wall rather than through the intermediary of an air bag as in my earlier disclosure. The direct application of air pressure has several advantages. First, the tire must be seated on the rims of the bead plates 133 to establish a proper seal which assures that the casing will be properly centered thereon. In addition, any holes in the tire casing or any broken or excessively weak beads will be automatically uncovered since maintenance of a seal will be impossible in such instances. Hence, the direct application of the air pressure serves as a secondary inspection for the casing.

While the casing 132 is being mounted and brought to the proper diameter on the plates 133, the tread stock strip 56 simultaneously can be moved into position and cut to the predetermined length. To accomplish this, a button 220 is pressed which closes contacts to energize the roller motor 48 and thereby drive the knurled roller 44. The cover 42 thereupon is rolled onto the roller 44 and the now-uncovered layer 40 is moved along the conveyor 25 until it contacts and moves the limit switch lever 82 at the forward end of the conveyor 25. This causes the roller motor 48 to stop and thus stop movement of the layer 40. At this time, a lamp 222 is lighted, indicating to the operator that the strip 56 is ready to be cut. This is effective by pulling a control knob 224 which opens a valve to supply air to the cutter ram 60 through the line 66. This forces the cutter blade 58 downwardly through the strip 56 and against the back-up bar 70. The blade 58 thereby produces a smooth severed end for the strip. Further, the knife blade 58 is cold to prevent partial vulcanization of the end of the strip which would otherwise reduce its adhesive quality, as has heretofore occurred with conventional heated blades.

Figure 15:
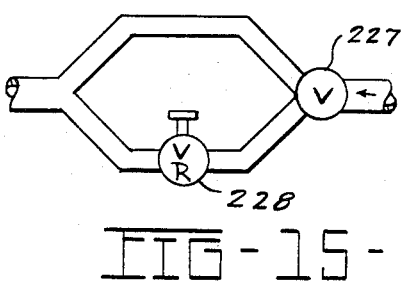
FIG. 15 is a diagrammatic view of part of the controls used with the apparatus.

With the diameter of the casing 132 properly adjusted and the strip 56 cut to the predetermined length and in position with the forward end against the lever 82 and above the pressure roller 135, the forward end of the conveyor 25 is raised by applying low pressure air, in the order of 35–40 p.s.i., for example, to the lifting hoist or ram 186. This causes the lever 184 to move in a counterclockwise direction and raise the lever 178 with the roller 176 then sliding along the track 174. The conveyor moves to the position shown in dotted lines in FIG. 9, with the strip 56 pressed against the central portion of the periphery of the casing 132 by the roller 135. This movement of the conveyor 25 is effected through a control lever 226 (FIG. 14) which is moved downwardly. A valve 227 (FIG. 15) is then opened to a position to supply air through a regulator 228 to the ram. The casing 132 and the bead plates 133 are then slowly rotated in a counterclockwise direction to apply the strip 56 therearound, being placed in contact with the casing through the roller 135. The slow rotation is achieved by moving the lever 208 to disengage the bead clutch and by shifting a clutch lever 229 inwardly and to the left to effect bead plate rotation. A button 230 is then pressed to close a set of contacts and to jog the bead plates and the casing or to run them continuously by operation of a motor 231.

After the strip 56 has been applied to the casing and the ends of the strip properly abutted, the strip is more fully adhered to the casing by applying high pressure air to the lift cylinder 186, thereby placing greater pressure on the casing through the strip 56. This is accomplished by moving the lever 226 to the upper position which moves the valve 227 and which causes the air to by-pass the regulator 228. The supply air, which is regulated to a pressure of 55–60 p.s.i., is then applied directly to the lifting ram 186. The casing is then rotated to force the strip into good contact with the casing around the entire periphery. It is important that relatively low pressure air be used first to apply the strip to the casing and then to use the higher pressure air only after the strip has been applied around the entire periphery. It has been found that if the higher pressure air is first used, the strip 56 will actually be extruded or stretched during its application to the casing.

During the application of the high pressure through the roller 135, the tire can be rotated faster, which is accomplished by shifting the lever 229 outwardly and to the left to engage another gear train in the motor clutch. The motor 229 is then operated by closing a circuit by means of a button 232, which motor rotates the bead plates 133 continuously at the higher speed. The foot lever 188 is then pressed to move the stitching rollers 160 upwardly against the strip and around the sidewalls of the casing 132 to apply the strip firmly in place and force out any trapped air. The casing is rotated several times during this operation and the stitching rollers are moved relatively slowly to assure that substantially all portions of strip will be placed under sequential pressure.

The strip 56 is now properly applied to the casing and the casing and strip are ready for vulcanization to complete the retreaded tire. The rotation of the tire is then stopped and the rotation clutch disengaged by means of the lever 229. The knob 218 is then pushed inwardly to move the valve in a manner such as to vent to the atmosphere the air in the interior of the casing. The bead plates 133 are then moved by engaging the clutch lever 208 and pressing the button 210 to start the motor and to move the plates toward one another, thereby enabling the casing with the adhered strip to be removed therefrom.

The vulcanizing operation then can take place effective in a matrix of a given size to which the tire casings have been adjusted for proper fit therein. Preferably, the matrix is slightly smaller in diameter than those heretofore used, to achieve the advantages discussed in the aforesaid co-pending application.

Various modifications of the above described embodiment of the invention will be apparent to those skilled in the art and it is to be understood that such modifications can be made without departing from the scope of the invention, if they are within the spirit and the tenor of the accompanying claims.

I claim:

1. Apparatus for applying retreading stock to the periphery of a prepared tire casing, said apparatus comprising means for rotatably supporting a prepared tire casing, means for rotatably supporting a roll of retreading stock which includes a rubber layer and a cover, means for guiding the retreading stock along a path toward said casing supporting means, a cutter, means for moving the retreading stock along the path past said cutter and toward said casing supporting means, said moving means comprising roller means for grasping and pulling the cover of the retreading stock, said roller means being on the side of said cutter toward said roll supporting means, said roller means adapted to strip the cover from the rubber layer before the stock reaches said cutter, means near said casing supporting means for actuating said cutter to sever a strip of the rubber layer from the stock, means for raising the end of the severed strip near said supporting means to move the severed strip into contact with a casing supported on said casing supporting means and to press the strip against the casing under light pressure, pressure means for forcing said severed strip against the periphery of the casing under heavier pressure, and stitching means for applying the strip around the side walls of the casing.

2. Apparatus for applying retreading stock to the periphery of a prepared tire casing, said apparatus comprising means for supporting a prepared tire casing, means for rotatably supporting a roll of retreading stock which includes a rubber layer and a cover, means for guiding the retreading stock along a path toward said casing supporting means, a cutter, means for moving the retreading stock along the path past said cutter and toward said casing supporting means, said moving means comprising roller means for grasping and pulling the cover of the retreading stock, said roller means being on the side of said cutter toward said roll supporting means, said roller means adapted to strip the cover from the rubber layer before the stock reaches said cutter, means for actuating said cutter to sever a strip of the rubber layer of predetermined length from the stock, and means for applying the severed strip to the periphery of a tire casing.

3. Apparatus for applying a retreading stock to the periphery of a prepared tire casing, said apparatus comprising means for supporting a prepared tire casing, means for supporting a supply of retreading stock which includes a rubber layer and a cover, a cutter, means for moving the retreading stock from the supply means past said cutter and toward said casing supporting means, said moving means comprising roller means for grasping and pulling the cover of the retreading stock, said roller means being on the side of said cutter toward said supply means, said roller means adapted to strip the cover from the rubber layer before the stock reaches said cutter, and means for applying the severed strip to the periphery of a tire casing.

4. Apparatus for applying retreading stock to the periphery of a prepared tire casing, said apparatus comprising a conveyor, means for rotatably supporting a prepared tire casing near one end of said conveyor, means for rotatably supporting a roll of retreading stock which includes a rubber layer and a cover near the other end of said conveyor, means for guiding the retreading stock along the conveyor toward said casing supporting means, means for symmetrically moving said guiding means with respect to the longitudinal axis of the conveyor to accommodate different widths of the stock, a cutter assembly supported above said conveyor between said casing supporting means and said stock roll supporting means, means for longitudinally moving said cutter assembly along said conveyor, means for moving the retreading stock along said conveyor past said cutter assembly and toward said casing supporting means, said moving means comprising a knurled roller for grasping and pulling the cover of said retreading stock, means supporting said roller on the side of said cutter assembly toward said roll supporting means and movable with said cutter assembly, said roller being adapted to strip the cover from the rubber layer before the stock reaches said cutter assembly, means for rotating said roller, means near said casing supporting means for actuating said cutter assembly to sever a strip of the rubber layer from the stock when said actuating means is engaged by an end of the rubber layer, means for raising the end of the severed rubber layer strip near said supporting means to move the severed strip into contact with the casing supported on said casing supporting means, and resilient pressure means for applying pressure to said severed strip to force said severed strip against the periphery of the casing.

5. Apparatus for applying retreading stock to the periphery of a prepared tire casing, said apparatus comprising a conveyor, means for rotatably supporting a prepared tire casing near one end of said conveyor, means for rotatably supporting a roll of retreading stock which includes a rubber layer and a cover near the other end of said conveyor, means for guiding the retreading stock along the conveyor toward said casing supporting means, means for moving said guiding means transversely of the conveyor to accommodate different widths of the stock, a cutter assembly supported above said conveyor between said casing supporting means and said stock roll supporting means, means for longitudinally moving said cutter assembly along said conveyor, means for moving the retreading stock along said conveyor past said cutter assembly and toward said casing supporting means, said moving means comprising a roller for grasping and pulling the cover of said retreading stock, means supporting said roller on the side of said cutter assembly toward said roll supporting means, said roller being adapted to strip the cover from the rubber layer before the stock reaches said cutter assembly, means for rotating said roller, means for actuating said cutter assembly to sever a strip of the rubber layer from the stock when said actuating means is engaged by an end of the rubber layer, and means for applying the severed strip to the casing.

6. Apparatus for handling rubber stock comprising a conveyor, means for rotatably supporting a roll of the rubber stock which includes a rubber layer and a cover near an end of said conveyor, adjustable means for guiding the stock along the conveyor, a cutter assembly supported above said conveyor, said cutter assembly being longitudinally movable along said conveyor, means for moving the stock along said conveyor past said cutter assembly, said moving means comprising a roller for grasping and pulling the cover of said stock, said roller being on the side of said cutter assembly toward said roll supporting means, said roller being adapted to strip the cover from the rubber layer before the stock reaches said cutter assembly, means for rotating said roller, and means for actuating said cutter assembly to sever a strip of the rubber layer from the stock.

7. Apparatus for applying retreading stock to the periphery of a prepared tire casing, said apparatus comprising means for rotatably supporting a prepared tire casing, means for rotatably supporting a roll of retreading stock which includes a rubber layer and a cover, means for guiding the retreading stock along a path toward said casing supporting means, a cutter, means for moving the retreading stock along the path past said cutter and toward said casing supporting means, means near said casing supporting means for actuating said cutter to sever a strip of the rubber layer from the stock, means for raising the end of the severed strip near said supporting means to move the severed strip into contact with a casing supported on said casing supporting means and to press the strip against the casing under light pressure, pressure means for forcing said severed strip against the periphery of the casing under heavier pressure, and stitching means for applying the strip around the side walls of the casing.

8. Apparatus for applying retreading stock to the periphery of a prepared tire casing, said apparatus comprising a conveyor, means for rotatably supporting a prepared tire casing near one end of said conveyor, means for rotatably supporting a roll of retreading stock which includes a rubber layer and a cover near the other end of said conveyor, means for guiding the retreading stock along the conveyor toward said casing supporting means, means for symmetrically moving said guiding means with respect to the longitudinal axis of the conveyor to accommodate different widths of the stock, a cutter assembly supported above said conveyor between said casing supporting means and said stock roll supporting means, means for longitudinally moving said cutter assembly along said conveyor, means for moving the retreading stock along said conveyor past said cutter assembly and toward said casing supporting means, means near said casing supporting means for actuating said cutter assembly to sever a strip of the rubber layer from the stock when said actuating means is engaged by an end of the rubber layer, means for raising the end of the severed rubber layer strip near said supporting means to move the severed strip into contact with the casing supported on said casing supporting means, and resilient pressure means for applying pressure to said severed strip to force said severed strip against the periphery of the casing.

References Cited

UNITED STATES PATENTS

| | | | |
|---|---|---|---|
| 1,353,934 | 9/1920 | Morris | 156—512 X |
| 1,399,118 | 12/1921 | Hermann | 156—405 X |
| 1,867,370 | 7/1932 | Maynard | 156—405 |
| 1,961,725 | 6/1934 | Abbott | 156—405 |
| 2,121,252 | 6/1938 | Marco | 156—405 |
| 2,268,334 | 12/1941 | Hirsch et al. | 156—406 X |
| 2,282,579 | 5/1942 | Hawkinson | 156—96 |
| 2,346,439 | 4/1944 | Leguillon | 156—405 |
| 2,471,140 | 5/1949 | Breth | 156—405 X |
| 3,030,261 | 4/1962 | Roesch | 156—96 X |
| 3,097,984 | 7/1963 | Godfrey | 156—96 X |
| 3,170,829 | 2/1965 | Batten | 156—405 |
| 3,251,722 | 5/1966 | Holman | 156—96 |

EARL M. BERGERT, *Primary Examiner.*

C. B. COSBY, *Assistant Examiner.*